Jan. 14, 1964     E. E. REESE     3,117,336
SQUEEGEE AND WIPER BLADE ASSEMBLY EMBODYING SAME
Filed Sept. 7, 1961     2 Sheets-Sheet 1
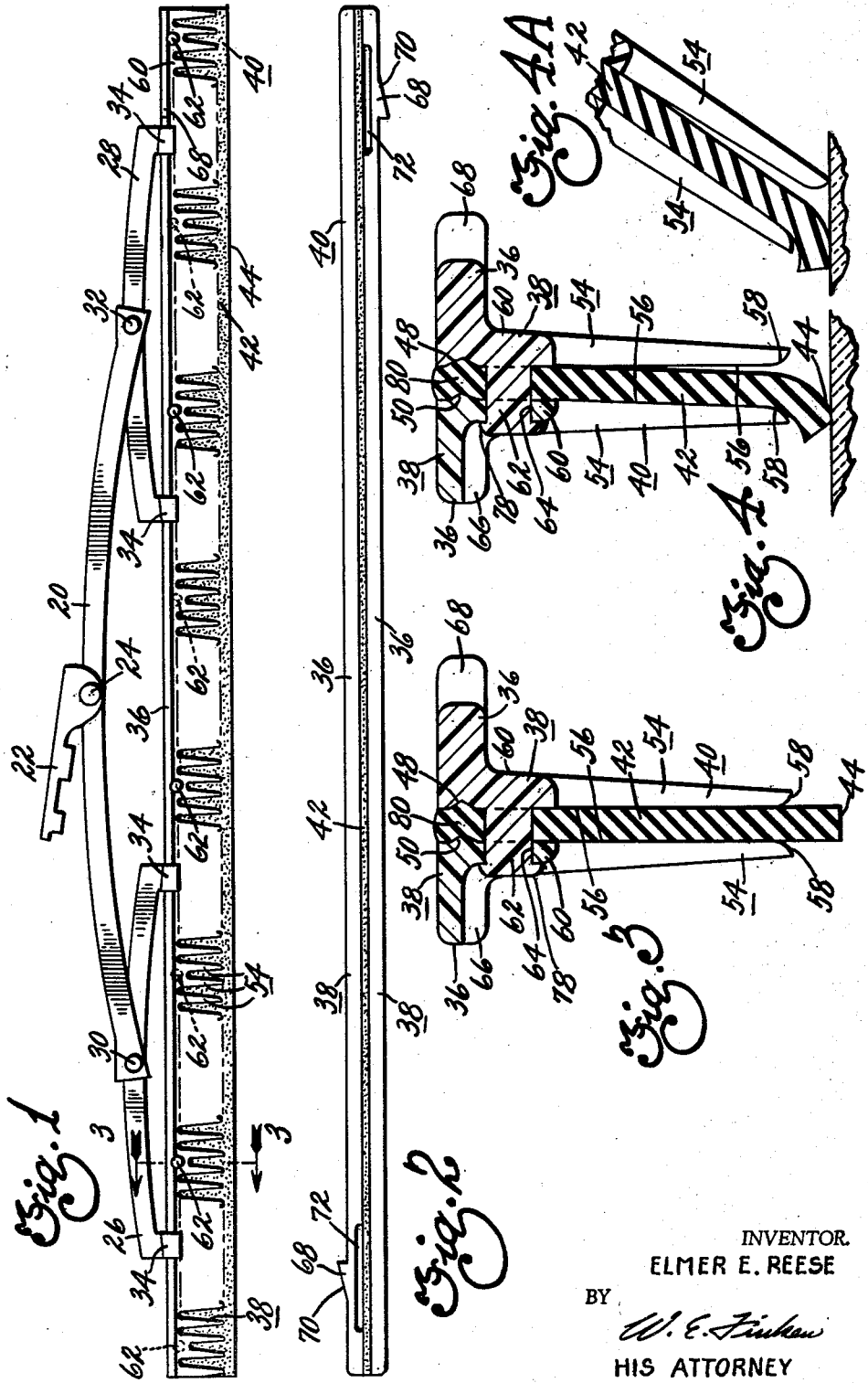
INVENTOR.
ELMER E. REESE
BY
W. E. Finken
HIS ATTORNEY

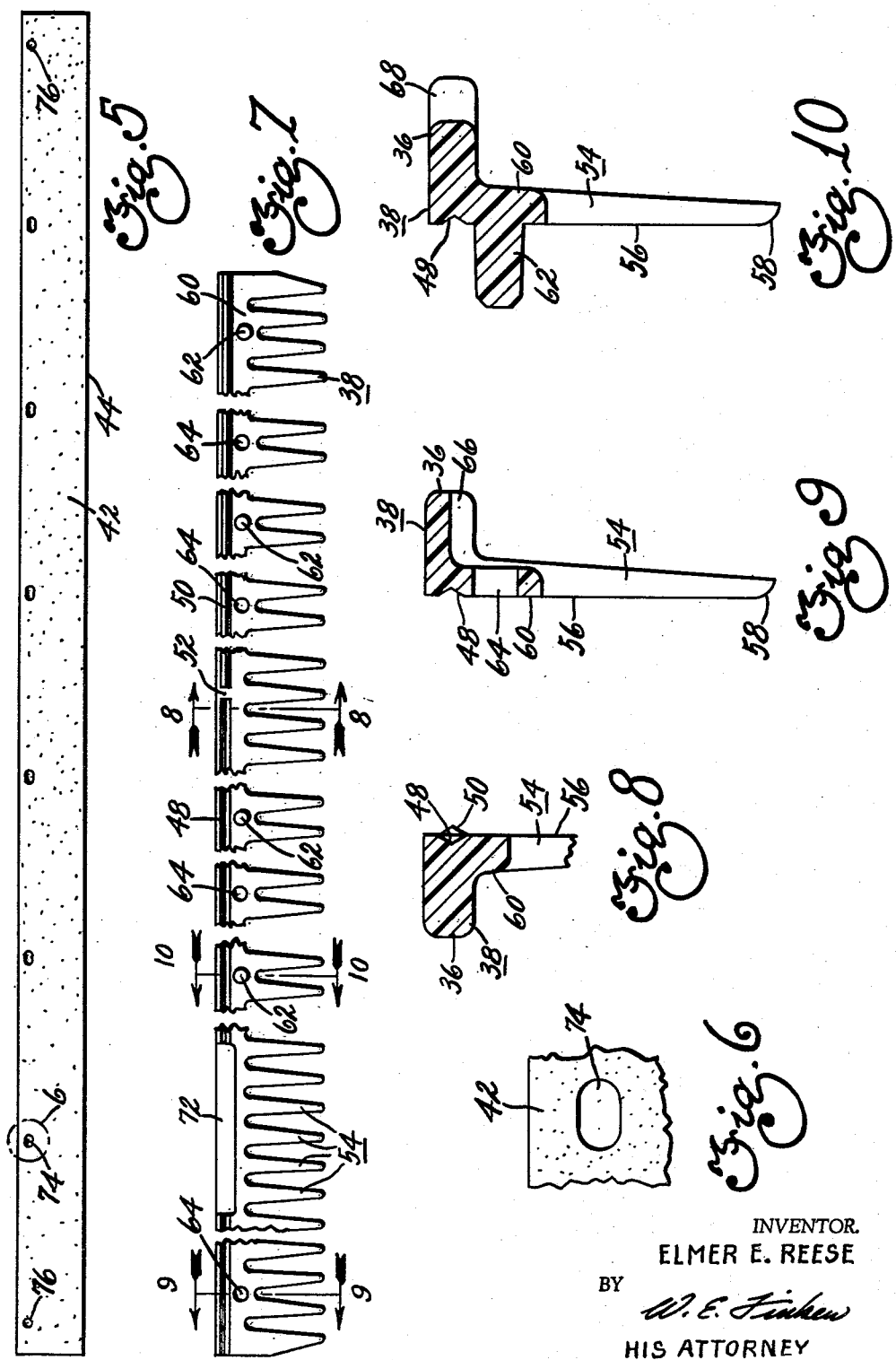

United States Patent Office 3,117,336
Patented Jan. 14, 1964

3,117,336
SQUEEGEE AND WIPER BLADE ASSEMBLY
EMBODYING SAME
Elmer E. Reese, Rochester, N.Y., assignor to General Motors Corporation, Detroit, Mich., a corporation of Delaware
Filed Sept. 7, 1961, Ser. No. 136,486
13 Claims. (Cl. 15—250.42)

This invention pertains to squeegees for wiping curved surfaces, and particularly to an improved flexible squeegee and a wiper blade assembly embodying the same.

Various types of wiper blade assemblies for wiping curved surfaces have been manufactured in the past embodying a molded rubber wiping element of substantially triangular configuration which is carried by a flexible metal backing strip so that the resultant assembly is readily flexible in a plane normal to the surface to be wiped while substantially inflexible in a plane parallel to such surface. The rubber wiping element and backing strip are carried by a pressure applying superstructure comprising either a plurality of relatively movable yokes, a plurality of stacked levers or a combination of yokes and levers. The pressure applying superstructure is connected to the backing strip at longitudinally spaced apart points so as to apply wiper arm pressure thereto, which pressure is distributed by the backing strip to maintain the wiping element in contact with the surface to be wiped and to conform it to the curvature thereof.

The present invention relates to an improved squeegee, or squeegee assembly, which is of substantially lower cost than the hitherto conventional squeegee assemblies previously alluded to. Moreover, the improved squeegee assembly of this invention eliminates the metal to metal connections thus resulting in a wiper blade assembly which is quieter in operation and less susceptible of scratching the glass surface over which it is moved due to engagement between the metal parts and the glass. Accordingly, among my objects are the provision of an improved squeegee comprising a strip-type elastomeric wiping element and a plastic support, or retainer, assembled therewith so that the resultant squeegee is flexible in a plane normal to the surface to be wiped while substantially inflexible in a plane parallel to such surface; the further provision of an improved flexible support for the wiping element of a squeegee; the further provision of a squeegee comprising an elastomeric wiping element and a flexible comb-like support therefor; the further provision of a squeegee comprising a pair of interlocked comb-like plastic supports and a strip-type wiping element clamped therebetween and interlocked therewith, the teeth of the supports limiting tilting of the wiping element in both directions, and the still further provision of a wiper blade assembly including a pressure applying superstructure detachably connected at longitudinally spaced apart points to coplanar flanges of a squeegee of the aforesaid type.

The aforementioned and other objects are accomplished by arranging the plastic supports on opposite sides of a rubber strip, the two supports being interlocked by integral dowels which extend through holes in the rubber strip and mating holes in the opposite support, which dowels are spun thereover so that the rubber strip is clampingly embraced and interlocked with the plastic supports. Specifically, each support is composed of a relatively hard, or stiff, resiliently flexible member composed of a polymer plastic, such as polymerized formaldehyde, known in the trade as "Delrin." Each support has a longitudinally extending flange of greater width than thickness extending outwardly therefrom, and a plurality of longitudinally spaced tines, or teeth, which are disposed in a plane normal to the plane of the flange. Hence the supports are generally comb-like in configuration with the teeth being of tapering cross-section from their roots to their tips. Each comb-like support has a plurality of longitudinally spaced transversely extending integral dowels of tapered configuration extending laterally from a web beneath the flange and alternately spaced with holes adapted to receive mating dowels from the other support. The supports for opposite sides of the strip-type wiping element are of identical configuration but are reversed with respect to each other so that the dowels of each support are aligned with mating holes in the support to which it is connected. The length of each support is coextensive with the length of the wiping element.

The strip-type wiping element which is composed of rubber or rubber-like material, has a trimmed wiping lip along one edge and a plurality of longitudinally spaced apart holes adjacent the opposite edge, equal in number to the number of dowels in the plastic supports. The holes adjacent the ends of the wiping element are of circular configuration whereas the holes between the ends of the wiping element are of longitudinally elongated oval configuration. To assemble the wiping element with the plastic supports, it is only necessary to insert the dowels of the mating plastic supports through the corresponding holes in the wiping element and thereafter spin over the dowels in the mating plastic support so that the wiping element will be clampingly embraced between the two supports. Since the wiping element is freely flexible, whereas the plastic supports are only flexible in a plane normal to the surface to be wiped, the resultant squeegee is substantially inflexible in a plane parallel to the surface to be wiped while being flexible in a plane normal to such surface.

The flanges on the plastic supports are designed to be straddled by the claws at the free ends of the pressure applying superstructure. In order to detachably connect the pressure applying superstructure with the squeegee, the flanges can conveniently embody marginal abutments adjacent opposite ends of the squeegee which, while permitting limited sliding movement, or lost motion, of the pressure applying superstructure relative to the squeegee, will serve to prevent inadvertent disassembly of the superstructure and the squeegee during operation. Moreover, the abutment means can be manually deflected to permit disassembly of the pressure applying superstructure and the squeegee should the need arise to replace the squeegee due to wear thereof.

Further objects and advantages of the present invention will be apparent from the following description, reference being had to the accompanying drawings, wherein a preferred embodiment of the present invention is clearly shown, and wherein similar numerals depict similar parts throughout the several views.

In the drawings:

FIGURE 1 is a side view in elevation of a wiper blade assembly constructed according to the present invention.

FIGURE 2 is a plan view of a squeegee constructed according to the present invention.

FIGURE 3 is an enlarged, sectional view, taken along line 3—3 of FIGURE 1 with the superstructure removed.

FIGURES 4 and 4A depict operation of the squeegee as it is moved across a glass surface under different operating conditions.

FIGURE 5 is a side, elevational view of the wiping element.

FIGURE 6 is a fragmentary, enlarged view taken in the area of circle 6 of FIGURE 5.

FIGURE 7 is an enlarged side, elevational view of a plastic support, with certain parts broken away.

FIGURES 8, 9 and 10 are enlarged, sectional views taken along lines 8—8, 9—9 and 10—10 of FIGURE 7.

With particular reference to FIGURE 1, the wiper assembly of this invention is shown comprising a triple yoke pressure applying superstructure including a primary yoke 20 of channel-shape having an arm attaching clip 22 pivotally connected to the central portion thereof by a transversely extending pin 24 and a pair of secondary yokes 26 and 28 pivotally connected to opposite ends of the primary yoke by transversely extending pins 30 and 32, respectively. The secondary yokes 26 and 28 are likewise of channel shape and are adapted to be nestingly received between the side walls of the channel-shaped primary yoke 20. The free ends of the secondary yokes 26 and 28 are formed with claws 34 arranged to straddle flanges 36 on the plastic supports, or retainers, 38 of a squeegee 40. Thus, the superstructure is movably connected to the squeegee 40 at a plurality of longitudinally spaced apart points. Obviously, the squeegee 40 can be used with other types of pressure applying superstructures, and hence the specifically disclosed triple yoke pressure applying superstructure is only shown by way of example.

With reference to FIGURES 2 and 3, the squeegee 40 comprises a strip-type rubber wiping element 42 having a wiping lip 44 along one edge. The wiping element 42 is clampingly embraced and interlocked with the plastic supports 38 disposed on opposite sides thereof. Preferably the supports 38 are composed of a stiff, resiliently flexible polymer plastic having the requisite physical properties making it suitable for use in wiper blades for vehicles. Thus, the supports 38 may be composed of a polymerized formaldehyde known in the trade as "Delrin," which can be conveniently molded in the comb-like structure disclosed herein.

Referring to FIGURES 7 through 10, each elongate plastic support, or support member, 38 is formed with an outwardly extending flange 36 of substantially greater width than thickness so as to render the support relatively inflexible in a plane parallel to the surface to be wiped, or the plane of the flanges, while having the requisite flexibility in a plane normal to such surface. The flange 36 extends the entire length of the support and has a V-shaped groove 48 extending throughout slightly more than half the length of the support. A V-shaped inwardly extending rib, or tongue, 50 is formed on the remaining portion of flange 36 in alignment with the groove 48 with an intermediate flat 52 disposed between the groove 48 and the rib 50. A plurality of longitudinally, equidistantly spaced tapered teeth, or tines, 54 are disposed in a plane normal to the flange 36, the teeth 54 tapering from their roots to their tips and having substantially flat sides 56 adapted to engage opposite sides of the strip-type wiping element 42. The inner surfaces of the tip ends of the teeth 54 are radiused at 58 to prevent their cutting into the wiping element during movement thereof across a surface to be wiped. The teeth 54 are capable of limited lateral deflection during movement of the squeegee across the surface to be wiped, thus permitting a substantial portion of the wiping element to tilt relative to the support so that the wiping lip can assume the requisite drag position as it is moved across a wet glass surface such as indicated in FIGURE 4. However, the teeth 54 have sufficient lateral stiffness to prevent excessive tilting of the wiping element. When the glass surface is tacky, excessive layover of the blade can occur as seen in FIGURE 4A. Under these conditions the ends of the teeth 54 engage the glass surface to reduce the friction load on the drive mechanism without scratching the glass surface.

The interconnecting web 60 between the teeth 54 and the flange 36 has a plurality of laterally extending dowels, or tapered plugs 62, equidistantly spaced apart with holes 64 disposed therebetween. The flange 36 adjacent each hole is formed with an arcuate groove 66 to accommodate the upset end portion of the dowels as will be pointed out in particular hereinafter. In addition, the flange 38 has a marginal abutment 68 adjacent one end with a tapered marginal edge 70, or cam surface, and a slot 72 formed on the inner edge so as to permit lateral flexing of the flange to facilitate engagement and disengagement of the squeegee with the claws of the pressure applying superstructure. More particularly, as seen in FIGURE 1, the marginal abutments 68 adjacent opposite ends of the squeegee preclude separation of the pressure applying superstructure from the squeegee while permitting limited relative longitudinal movement therebetween. The abutments constitute a releasable interlock that permits disassembly of the superstructure with the squeegee by laterally depressing the marginal abutment 68 and effecting relative longitudinal movement between the squeegee and the superstructure.

With reference to FIGURE 5, the strip-type wiping element 42 is formed with six longitudinally elongate holes 74, and a circular hole 76 adjacent each end. The total number of holes, namely eight, is, of course, equal to the number of dowels on both of the plastic supports 38. To assemble the wiping element 42 with the plastic supports, it is only necessary to insert the dowels through the holes in the wiping element, it being understood that the two plastic supports are of identical configuration, but in assembly are reversed end for end. Thus, the dowels 62 of one plastic support extend through the openings 64 in the other plastic support, with the projecting ends of the dowels being upset by a spinning operation so that the wiping element is clampingly embraced by the plastic supports as indicated in FIGURE 3. The upset end portion 78 of each dowel constitutes a means for rigidly interconnecting the two plastic supports. Moreover, since the plastic supports 38 are reversed end for end, the rib 50 is aligned with the groove 48 on its mating support so as to clampingly embrace the back portion of the wiping element 42 as depicted in FIGURE 3.

An inspection of FIGURE 3 will reveal that the back portion of the strip-type wiping element 42 is deformed in the area 80 by the aligned rib 50 and groove 48 in the laterally spaced supports 38. The lateral deformation of the wiping element 42 in the area 80 is sufficient to transmit wiper arm applied pressure from the supports 38 directly to the wiping element 42. Wiper arm applying pressure is also transmitted to the wiping element 42 by the dowels 62 which extend between the laterally spaced supports 38 since the diameter of the end holes 76 is the same as the maximum diameter of the dowels 62, and the vertical height of the longitudinally elongate holes 74 is likewise substantially the same as the maximum diameter of the dowels 62. The intermediate longitudinal elongate holes 74 in the strip-type wiping element 42 are designed to allow limited movement between the wiping element and the plastic supports during flexure of the squeegee to conform to the curved surface over which it is moved.

The resultant squeegee is substantially less expensive to manufacture than conventional squeegees embodying a molded wiping element and a spring metal backing since the wiping element is made from strip stock which is cut to size, has the holes punched therein and has the wiping lip trimmed to produce a wiping edge. The plastic supports are relatively inexpensive to manufacture, particularly since identical supports are used on opposite sides of the wiping element. The assembly technique is straightforward in that the holes are punched in the wiping element so as to be aligned with the dowels in the supports, and after the three parts are clamped together the projecting ends of the dowels can be readily spun over to maintain the several parts of the assembly in their assembled relation. The pressure applying superstructure can likewise be readily attached to the flanges of the supports for applying wiper arm pressure at longitudinally spaced points along the length of the squeegee. The completed wiper blade assembly is capable of conforming to curvatures of substantial magnitude so as to produce an acceptable wiper blade for use on present day vehicles.

While the embodiment of this invention as herein disclosed constitutes a preferred form, it is to be understood that other forms might be adopted.

What is claimed is as follows:

1. A squeegee including, an elongate, elastomeric strip-type wiping element having a wiping lip along one edge, and a pair of interconnected elongate, supports disposed on opposite sides of said wiping element and clampingly embracing the opposite edge thereof, said supports being resiliently flexible in a plane normal to a surface to be wiped while being substantially inflexible in a plane parallel to such surface, and having a plurality of longitudinally spaced teeth engageable with opposite sides of said wiping element and terminating short of said wiping lip.

2. A squeegee including, an elongate, elastomeric strip-type wiping element having a wiping lip along one edge, and a pair of interconnected elongate, flexible supports disposed on opposite sides of said wiping element and clampingly embracing the opposite edge thereof, said supports including outwardly extending flanges aligned with the opposite edge of said wiping element and a plurality of longitudinally spaced teeth engaging opposite side surfaces of said wiping element, said teeth extending from said flanges and terminating short of said wiping lip.

3. A squeegee including, an elongate, elastomeric strip-type wiping element having a wiping lip along one edge, an elongate, flexible support on each side of said wiping element including an outwardly extending flange and a plurality of longitudinally spaced teeth extending therefrom in engagement with one side of said wiping element and terminating short of the wiping lip thereof, and means rigidly interconnectig said supports to clampingly embrace the wiping element therebetween.

4. A squeegee including, an elongate, elastomeric strip-type wiping element having a wiping lip along one edge, an elongate, flexible support disposed on each side of said wiping element including an outwardly extending longitudinal flange coextensive with the length of said wiping element and a plurality of teeth extending therefrom in engagement with one side of said wiping element and terminating short of the wiping lip thereof, said teeth being gradually tapered from their roots to their tips, and means rigidly interconnecting said supports so as to clampingly embrace the wiping element therebetween.

5. A squeegee including, an elongate, elastomeric strip-type wiping element having a wiping lip along one edge and having a plurality of longitudinally spaced holes therethrough adjacent the opposite edge, an elongate support on each side of said wiping element, said supports being flexible in a plane normal to the surface to be wiped but substantially inflexible in a plane parallel to such surface and having aligned dowels and holes with the dowels extending through the holes in said wiping element, and means interconnecting said supports to clampingly embrace the opposite edge of said wiping element therebetween including upset end portions of said dowels.

6. A squeegee including, an elongate, elastomeric strip-type wiping element having a wiping lip along one edge, a pair of elongate, resiliently flexible support members disposed on opposite sides of said wiping element, said wiping element having a plurality of longitudinally spaced apart holes along the opposite edge, and means rigidly interconnecting said support members at a plurality of longitudinally spaced apart points so as to clampingly embrace the wiping element therebetween including a plurality of dowels which extend through the openings in the wiping element.

7. A squeegee including, an elongate, elastomeric strip-type wiping element having a wiping lip along one edge, a pair of elongate flexible support members disposed on opposite sides of said wiping element, each support member having outwardly extending longitudinal flanges coextensive with the length of said wiping element, the inner edges of said flanges having mating tongue and groove means extending throughout substantially the entire length thereof, and means interconnecting said support members so as to clampingly embrace the wiping element therebetween and laterally deform a portion of said wiping element by said mating tongue and groove means.

8. The squeegee set forth in claim 7 wherein said pair of support members are identical but reversed end to end, and wherein said mating tongue and groove means comprises a laterally projecting tongue which extends throughout less than half of the length of each support member and an aligned groove which extends throughout at least half the length of each support member.

9. The squeegee set forth in claim 7 wherein each support member includes a plurality of spaced teeth engageable with opposite sides of said wiping element and terminating short of said wiping lip.

10. A flexible squeegee support comprising, a pair of laterally spaced elongate members adapted to clampingly embrace a wiping element disposed therebetween, each member having an outwardly extending longitudinal flange and a plurality of longitudinally spaced teeth disposed in a plane substantially normal to said flange, said members being flexible in the plane of said teeth and substantially inflexible in the plane of said flanges, and means for rigidly interconnecting said members at a plurality of longitudinally spaced apart points.

11. A flexible squeegee support comprising, a pair of identical elongate members reversed end to end and laterally spaced to clampingly embrace a wiping element disposed therebetween, each member having an outwardly extending longitudinal flange and a plurality of longitudinally spaced teeth disposed in a plane substantially normal to said flange, said members being flexible in the plane of said teeth and substantially inflexible in the plane of said flanges, and means for rigidly interconnecting said members at a plurality of longitudinally spaced apart points comprising a plurality of equidistantly spaced laterally extending dowels with a like number of openings equisdistantly spaced apart between said dowels whereby the dowels of each member will be aligned with the openings in the other member when the two members are reversed end for end.

12. A flexible squeegee support comprising, a pair of elongate identical members reversed end for end and laterally spaced to clampingly embrace a wiping element disposed therebetween, each member having an outwardly extending longitudinal flange and a plurality of longitudinally spaced teeth disposed in a plane substantially normal to said flange, said members being flexible in the plane of said teeth and substantially inflexible in the plane of said flanges, the inner edge of the flange of each member having a groove extending throughout at least half of the length thereof and a tongue in alignment with said groove and extending throughout less than half the length thereof, and means for rigidly interconnecting said members at a plurality of longitudinally spaced points so that the groove of each member is at least coextensive with the projecting tongue in the other member.

13. A wiper blade assembly including, a squeegee comprising an elongate, elastomeric strip-type wiping element having a wiping lip along one edge, a pair of laterally spaced elongate, resiliently flexible support members disposed on opposite sides of said wiping element, each of said support members having an outwardly extending longitudinal flange whereby the support members are flexible in a plane normal to the surface to be wiped while substantially inflexible in a plane parallel to such surface and means rigidly interconnecting said support members at a plurality of longitudinally spaced apart points, and a pressure applying superstructure comprising a plurality of relatively movable members having claws at their free ends which movably straddle the flanges of said support members at a plurality of longitudinally spaced apart points, the flange of each support member having an outwardly extending marginal abutment and an elongate slot on its inner edge in alignment with its marginal abutment, said abutment being located adjacent each end and on opposite sides of said squeegee and inwardly deflectable to facilitate assembly and disassembly of the superstructure with the squeegee.

References Cited in the file of this patent

UNITED STATES PATENTS

| | | |
|---|---|---|
| 1,370,463 | Lomano | Mar. 1, 1921 |
| 2,257,789 | Hoffman | Oct. 7, 1941 |
| 2,596,063 | Anderson | May 6, 1952 |
| 2,641,789 | Rappl | June 16, 1953 |
| 2,672,641 | Scinta et al. | Mar. 23, 1954 |
| 2,687,544 | Scinta | Aug. 31, 1954 |